United States Patent
Li et al.

(10) Patent No.: US 12,092,765 B2
(45) Date of Patent: Sep. 17, 2024

(54) LIDAR SYSTEM

(71) Applicant: Tanway Technology (Beijing) Co., Ltd., Beijing (CN)

(72) Inventors: Hongpeng Li, Beijing (CN); Ruitong Zheng, Beijing (CN); Zhengjie Zhang, Beijing (CN); Shiwei Wang, Beijing (CN); Luofeng Shen, Beijing (CN); Feifei Shi, Beijing (CN)

(73) Assignee: Tanway Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 18/253,910

(22) PCT Filed: Jan. 25, 2022

(86) PCT No.: PCT/CN2022/073843
§ 371 (c)(1),
(2) Date: Jul. 27, 2023

(87) PCT Pub. No.: WO2023/137778
PCT Pub. Date: Jul. 27, 2023

(65) Prior Publication Data
US 2023/0393246 A1    Dec. 7, 2023

(30) Foreign Application Priority Data

Jan. 19, 2022  (CN) .......................... 202210060316.4

(51) Int. Cl.
*G01S 7/48* (2006.01)
*G01S 7/481* (2006.01)

(52) U.S. Cl.
CPC .......... *G01S 7/4817* (2013.01); *G01S 7/4816* (2013.01)

(58) Field of Classification Search
None
See application file for complete search history.

(56) References Cited

U.S. PATENT DOCUMENTS 5,268,565 A * 12/1993 Katoh ................ G06K 7/10871
235/462.31
5,493,388 A * 2/1996 Adachi .................. G02B 26/12
359/219.1

(Continued)

FOREIGN PATENT DOCUMENTS

CN     207557465 U     6/2018
CN     110658509 A     1/2020
(Continued)

OTHER PUBLICATIONS

International Searching Authority (ISA/CN), International Search Report for PCT/CN2022/073843, Oct. 19, 2022, 10 pages (with translation).

(Continued)

*Primary Examiner* — Hovhannes Baghdasaryan
(74) *Attorney, Agent, or Firm* — Jaffery Watson Hamilton & DeSanctis LLP (57) ABSTRACT

The present disclosure provides a lidar system. The lidar system includes: an optical rotating mirror and at least two laser transceiving modules. Each laser transceiving module includes a transmitting unit and a receiving unit. The transmitting unit is configured to transmit a laser signal. The optical rotating mirror is configured to rotate around a rotating axis in a vertical direction, receive the laser signal and adjust a direction of the laser signal during rotation, and reflect the laser signal to a target object. The laser signal is diffusely reflected on the target object, which produces an echo signal. The echo signal is reflected by the optical rotating mirror and is then received by the receiving unit. The receiving unit includes a plurality of detectors arranged in an array.

9 Claims, 5 Drawing Sheets

(56) References Cited

U.S. PATENT DOCUMENTS

| | | | |
|---|---|---|---|
| 10,823,825 B2* | 11/2020 | Fried | G01S 17/89 |
| 2015/0034809 A1* | 2/2015 | Droz | G01J 1/0448 |
| | | | 250/216 |
| 2017/0255199 A1* | 9/2017 | Boehmke | G01C 21/34 |
| 2019/0310351 A1* | 10/2019 | Hughes | G01S 7/4817 |
| 2019/0317214 A1* | 10/2019 | Jeong | G01S 17/08 |
| 2020/0333444 A1 | 10/2020 | Fu et al. | |

FOREIGN PATENT DOCUMENTS

| | | |
|---|---|---|
| CN | 110749893 A | 2/2020 |
| CN | 110873868 A | 3/2020 |
| CN | 108061904 B | 12/2020 |
| CN | 113552578 A | 10/2021 |
| WO | 2021168849 A1 | 9/2021 |

OTHER PUBLICATIONS

International Searching Authority (ISA/CN), Written Opinion for PCT/CN2022/073843, Oct. 19, 2022, 8 pages (with translation).
Chinese Patent Application No. 202210060316.4 "First Office Action" mailed Mar. 9, 2022, 14 pages.
Chinese Patent Application No. 202210060316.4 "Notification to Grant Patent Right for Invention" mailed Apr. 8, 2022, 6 pages.
Chinese Patent Application No. 202210060316.4 "Second Office Action" mailed Mar. 30, 2022, 12 pages.

* cited by examiner

LIDAR SYSTEM

CROSS-REFERENCE TO RELATED APPLICATIONS

This application is a national phase application of International Application No. PCT/CN2022/073843, filed on Jan. 25, 2022, which claims the priority to Chinese patent application No. 202210060316.4, entitled "A LIDAR SYSTEM," filed on Jan. 19, 2022, with the China National Intellectual Property Administration, the entire contents of each of which are incorporated herein by reference.

TECHNICAL FIELD

The present disclosure relates to the field of photoelectric measurement technologies, and particularly to lidar systems.

BACKGROUND

Lidar systems were primarily used for surveying and mapping on platforms such as satellites and airplanes at first. In recent years, the lidar system has gradually entered the civilian market and developed rapidly in fields such as automatic driving. Taking the scene of automated driving of passenger vehicles as an example, the lidar system meeting vehicle regulations and standards and requirements of measurement ability in this scene needs to reach sufficient indexes in reliability, stability, performance, and cost. The lidar systems are usually divided into mechanical lidar systems and solid-state lidar systems. For the solid-state lidar system, it is unnecessary to continuously rotate most modules of the whole system, so that the solid-state lidar system is smaller and more stable, and with the continuous improvement of reliability of the solid-state lidar system, costs can also be greatly reduced. However, for a mechanical lidar system, the whole system is continuously rotated during operation, so that the mechanical lidar system is almost impossible to meet conventional requirements in terms of reliability and stability. Therefore, the current development trend of the lidar system is to be solid-state.

With the rapid development of related products of the lidar system and the demand of automatic driving manufacturers for the development of a higher-level automatic driving system, the demand of the market for parameter indexes of the lidar system is gradually increasing, mainly focusing on an extreme measurement distance and a measurement accuracy, a field angle, an angular resolution, a frame rate, a system size, and the like, wherein the extreme measurement distance and the measurement accuracy are mainly adjusted by energy and gains of transceiving modules of the lidar system and the performance of a subsequent data processing system.

In order to ensure that an output point cloud of the lidar system still has a sufficient resolution in long-distance measurement so as not to cause omission and misjudgment of an important target, it is usually necessary for the lidar system to ensure a sufficient angular resolution on the premise of reaching certain coverage of a field angle, such as ensuring an angular resolution of about 0.2° at a field angle of 120° (horizontal)×20° (vertical), which requires the radar system to ensure a sufficiently high number of lines, including more than 600 lines in a horizontal direction and more than 100 lines in a vertical direction. The number of lines is namely a few times of single-point measurement per frame. After distance measurement is performed once by each measuring unit of the lidar system, one measurement point is generated, and all measurement points of each frame will form a point cloud of the frame according to a corresponding angle of spread. Numbers of points in horizontal and vertical directions of the point cloud are numbers of lines in the two directions.

However, there are higher requirements of size and number for the transceiving module and the data processing module, due to the exponentially increased number of measurement points generated at the same time, while ensuring the high number of lines, so that the size of the whole lidar system can be inevitably increased. However, in order to meet the requirements of system stability and appearance, it is also necessary to compress the overall size, especially a height, of the lidar system at the same time. Therefore, how to ensure the high number of lines without increasing the size of the entire lidar system is an urgent technical problem to be solved in the field of photoelectric measurement technologies currently.

SUMMARY

(I) Technical Problems to be Solved

The technical problem to be solved by the present disclosure is how to ensure a high number of lines without increasing the size of the entire lidar system.

(II) Technical Solutions

In order to solve the technical problems above, the embodiments of the present disclosure provide a lidar system, and the lidar system includes:
  an optical rotating mirror and at least two laser transceiving modules, wherein each of the laser transceiving modules includes a transmitting unit and a receiving unit.

The transmitting unit is configured to transmit a laser signal; and the optical rotating mirror is configured to rotate around a rotating axis in a vertical direction, receive the laser signal and adjust a direction of the laser signal during rotation, and reflect the laser signal to a target object. An echo signal is produced by a diffuse reflection of the laser signal on the target object. The echo signal is reflected by the optical rotating mirror and then received by the received unit.

The receiving unit includes a plurality of detectors arranged in an array. In at least some of the receiving units, the detectors of different receiving units are arranged in the vertical direction and are located in different positions in the vertical direction.

Optionally, scanning angle ranges covered by adjacent laser transceiving modules are contiguously overlapped or partially over lapped.

Optionally, in at least some of the receiving units, the detectors of different receiving units are staggeringly arranged in the vertical direction.

Optionally, in at least some of the receiving units, arrangement heights of different receiving units are different.

Optionally, pitch angles of at least some of the receiving units are different.

Optionally, the optical rotating mirror includes a bottom surface and a plurality of reflecting surfaces surrounding the bottom surface, where included angles between different reflecting surfaces and the bottom surface are different.

Optionally, the receiving unit is also integrated with a receiving lens with a special-shaped cut, and a projection of the receiving lens on the receiving unit is located in the receiving unit.

Optionally, each laser transceiving module further includes a reflector set; and the reflector set is configured to reflect the laser signal transmitted by the transmitting unit to the optical rotating mirror. The laser signal is reflected by the optical rotating mirror to the target object. The echo signal is produced by a diffuse reflection of the laser signal on the target object. The echo signal is reflected by the optical rotating mirror and then received by the received unit.

An optical axis of the receiving unit coincides with a direction of the laser signal reflected by the reflector set to the optical rotating mirror.

Optionally, the reflector set includes a first reflector and a second reflector;

The first reflector is configured to reflect the laser signal transmitted by the transmitting unit to the second reflector. The second reflector is configured to reflect the laser signal reflected by the first reflector to the optical rotating mirror. The laser signal is reflected by the optical rotating mirror to the target object.

The echo signal obtained after the laser signal is diffusely reflected on the target object is reflected by the optical rotating mirror to the receiving unit.

The optical axis of the receiving unit coincides with a direction of the laser signal reflected by the second reflector to the optical rotating mirror.

Optionally, the first reflector is parallel to the second reflector. An included angle between the first reflector and an optical axis of the transmitting unit ranges from 40 to 50 degrees.

It should be understood that the above general description and the following detailed description are exemplary and explanatory only, and cannot limit the present disclosure.

BRIEF DESCRIPTION OF THE DRAWINGS

The drawings herein are incorporated into the specification and constitute a part of the specification, show the embodiments that conform to the present disclosure, and are configured for explaining the principle of the present disclosure together with the specification.

In order to illustrate the technical solutions in the embodiments of the present disclosure or the prior art more clearly, the drawings to be used in the description of the embodiments or the prior art will be briefly described below. Obviously, those of ordinary skills in the art can also obtain other drawings based on these drawings without going through any creative work.

DETAILED DESCRIPTION OF THE EMBODIMENTS

In order to better understand the above objects, features and advantages of the present disclosure, the solutions of the present disclosure will be further described below. Obviously, the described embodiments are merely a part of, rather than all of, the embodiments of the present disclosure. Based on the embodiments in the present disclosure, all other embodiments obtained by those of ordinary skills in the art without going through creative works shall fall within the scope of protection of the present disclosure.

In the related art, for a lidar system on the current market, the number of longitudinal lines is mainly 16 lines and 64 lines, there are few lidar systems capable of achieving about 100 lines or even higher number of lines, and the lidar system cannot take into account a size and a cost, and is difficult to achieve the goal of low-cost mass production on the premise of meeting indexes such as a size and a resolution of a field angle.

Figure 1:
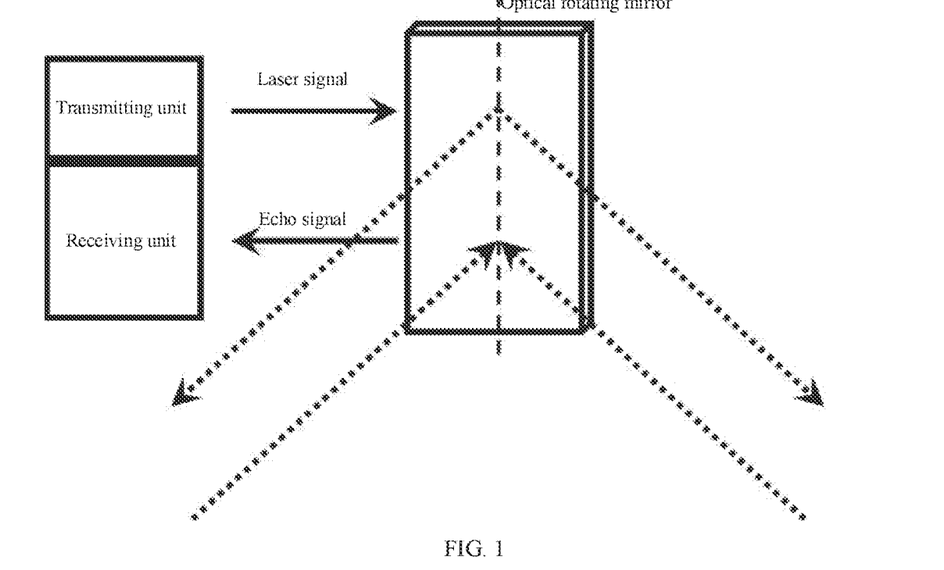
FIG. 1 is a schematic structural diagram of a lidar system in the prior art.

In the prior art, for example, coverage of a field angle may be realized by a rotating mirror system, wherein an angular resolution of a horizontal field may be adjusted by a measurement frequency during scanning, while an angular resolution of a vertical field can only be determined by a number of lines (which is namely a number of measuring units) of a linear array detector of a receiving unit, which means that it is necessary to select a detector with about 100 lines or more. Firstly, there is no mass-produced detector product with such a high number of lines in the market for the time being. Secondly, even if there is such a product or detection of the high number of lines is realized by longitudinal splicing of a plurality of detectors, a size of a receiving end and an aperture of a corresponding receiving lens will be both much greater than those of a current product with 16 lines or 64 lines, and in addition, a transmitting unit is integrated above a receiving unit, and the transmitting unit includes a laser device, a related driving circuit board and a collimating lens, as shown in FIG. 1. FIG. 1 is a schematic structural diagram of a lidar system in the prior art. In FIG. 1, the lidar system includes a transceiving module and a scanning module, wherein each of the transceiving modules includes a transmitting unit and a receiving unit. The scanning module includes an optical rotating mirror. The transmitting unit is configured to transmit a laser signal to the optical rotating mirror. The optical rotating mirror is configured to rotate around a rotating axis in a vertical direction and reflect the laser signal transmitted to the optical rotating mirror to a target object. An echo signal reflected by the target object is reflected by the optical rotating mirror and is received by the receiving unit. Dashed arrows in FIG. 1 represent the laser signal and the echo signal transmitted to the optical rotating mirror and reflected. According to a structure of the lidar system shown in FIG. 1, if the number of lines of the linear array detector of the receiving unit needs to reach about 100 lines or more, the height of the lidar system will exceed 100 mm or even reach 150 mm finally, and the size of the system is too large to meet a design requirement of 50 mm or even less than 45 mm.

In the related art, a scanning mirror of single-axis or double-axis MEMS (Micro-Electromechanical Systems) is configured to replace a traditional optical rotating mirror. Although this design can greatly reduce the size of the system, the cost will be increased by several times or even ten times compared with the optical rotating mirror at the same time, and a yield of production and adjustment can be reduced sharply, so that the requirement of low-cost mass production cannot be met.

For at least one of the technical problems above, the present disclosure mainly considers the improvement of integration, which refers to the reduction of the size of the whole lidar system, and the number of lines. On the premise of maintaining indexes, such as an extreme measurement distance and accuracy, of an existing lidar system, the present disclosure provides a lidar system with a smaller size and a high number of lines, especially a lidar system with a lower height.

Figure 2:
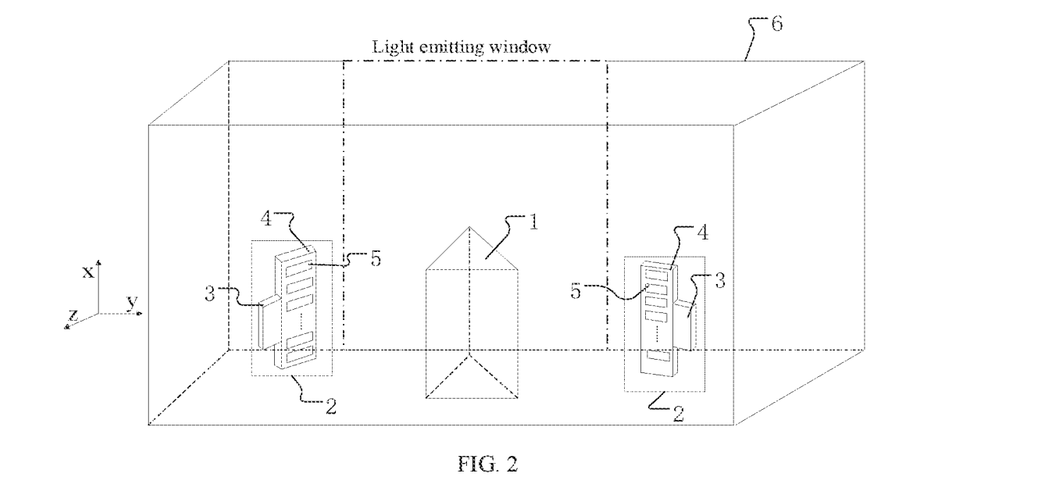
FIG. 2 is a stereoscopic structural diagram of a lidar system provided by the embodiments of the present disclosure.
Figure 3:
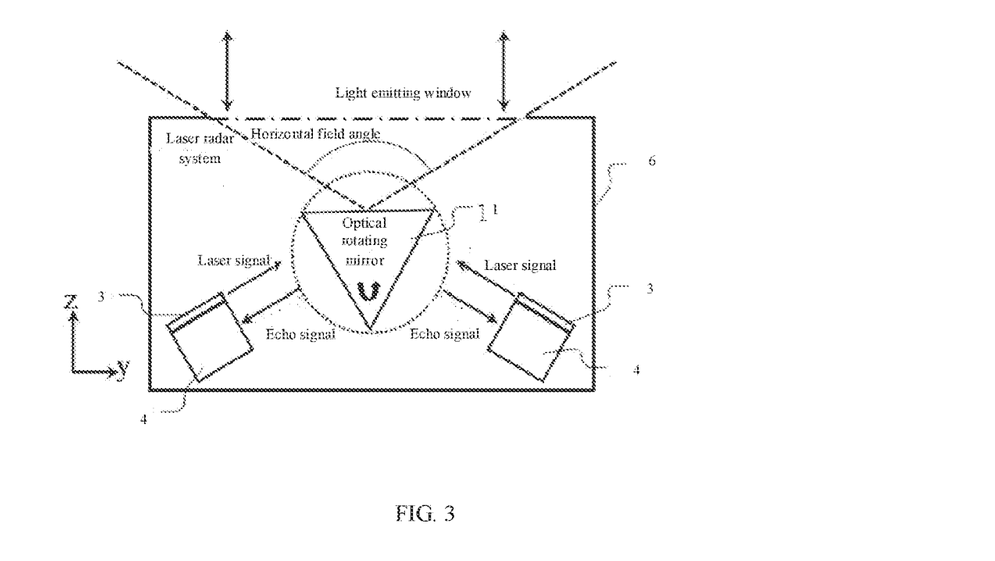
FIG. 3 is a top view of the lidar system shown in FIG. 2.

Referring to FIGS. 2 and 3, FIG. 2 is a stereoscopic structural diagram of a lidar system provided by the embodiments of the present disclosure, and FIG. 3 is a top view of the lidar system shown in FIG. 2. In FIGS. 2 and 3, a vertical direction is an x direction, a horizontal direction is a y direction, and a light emitting direction of the lidar system is a z direction. The lidar system includes: one optical rotating mirror 1 and at least two laser transceiving modules 2. For example, the lidar system may include two, three, four, or more laser transceiver modules 2. FIG. 1 only shows a structure of two laser transceiver modules 2. Each laser transceiving module 2 includes a transmitting unit 3 and a receiving unit 4. The transmitting unit 3 is configured to transmit a laser signal. the optical rotating mirror 1 is configured to rotate around a rotating axis in the x direction (the vertical direction), receive the laser signal and adjusting a direction of the laser signal during rotation, and reflect the laser signal to a target object. The diffuse reflection of the laser signal on the target object produces an echo signal. The echo signal is reflected by the optical rotating mirror 1 and is then received by the receiving unit 4.

The receiving unit 4 includes a plurality of detectors 5 arranged in an array. In at least some of the receiving units 4, the detectors 5 of different receiving units 4 arranged in the x direction (the vertical direction) are located in different positions in the x direction (the vertical direction). That is, the lidar system includes a plurality of laser transceiving modules 2, and the detectors 5 of at least some of the receiving units 4 in the plurality of laser transceiving modules 2 arranged in the x direction are located in different positions in the x direction. In the lidar system, for example, the detectors 5 of the receiving units 4 in all laser transceiving modules 2 arranged in the x direction may be located in different positions in the x direction. Alternatively, in the lidar system, for example, the detectors 5 of the receiving units 4 in some of laser transceiving modules 2 arranged in the x direction may be located in the same position in the x direction.

According to the lidar system provided by the embodiment of the present disclosure, the number of longitudinal lines can be doubled under the condition that the horizontal field angle is not changed, and the lidar system is simple in structure and easy to implement, and can not only take into account a size and a cost, but also achieve the goal of low-cost mass production on the premise of meeting indexes such as a size and a resolution of a field angle.

As shown in FIGS. 2 and 3, the lidar system further includes a housing 6. The housing 6 covers the optical rotating mirror 1 and the at least two laser transceiving modules 2, with a light emitting window for transmitting the laser signal to the target object. The echo signal obtained after the laser signal is diffusely reflected on the target object is transmitted to the optical rotating mirror 1 through the light emitting window, reflected by the optical rotating mirror 1, and then received by the receiving unit 4.

A number of laser transceiving modules 2 is set according to the requirements of an optical design of an actual lidar system, which is not limited in the present disclosure. A position of the laser transceiving module 2 placed in the lidar system is adjusted according to a structural design of the actual lidar system. Optionally, the lidar system includes two laser transceiving modules 2. As shown in FIGS. 2 and 3, the laser transceiving modules 2 are placed on two sides of the optical rotating mirror 1 and symmetrically arranged along an xz plane passing through a rotating axis of the optical rotating mirror 1 in the vertical direction. The symmetrical arrangement of the two laser transceiving modules 2 is for the convenience and simplicity of the overall structure design of the lidar system.

Optionally, scanning angle ranges covered by adjacent laser transceiving modules are contiguously overlapped or partially over lapped. The plurality of laser transceiving modules, for example, may have overlapped horizontal field angles, so that the horizontal field angles may be spliced. Therefore, by setting the number of laser transceiving modules, and mutually connecting or partially overlapping the scanning angle ranges covered by adjacent laser transceiving modules, this can not only ensure that the lidar system has a sufficient horizontal field of view, but also can cooperate with an optical circuit adjustment system in the lidar system and expand the horizontal field of view.

In FIG. 3, during the operation of the lidar system, the optical rotating mirror in the lidar system keeps rotating at a constant frequency to rotate continuously and stably. A circumscribed circle of a dotted line in FIG. 3 represents a rotating trajectory of the optical rotating mirror, and meanwhile, pointing directions of the laser signals transmitted by the two laser transceiving modules 2 are continuously adjusted, so that the two laser transceiving modules 2 may synchronously and continuously scan respective fields of the two laser transceiving. Because the two laser transceiving modules 2 are arranged on two sides of the optical rotating mirror 1, the two laser transceiving modules 2, for example, have the overlapping fields of views, which enables the splicing of the fields of views may be spliced and thus ensures a sufficient horizontal field of view of the system.

Figure 4:
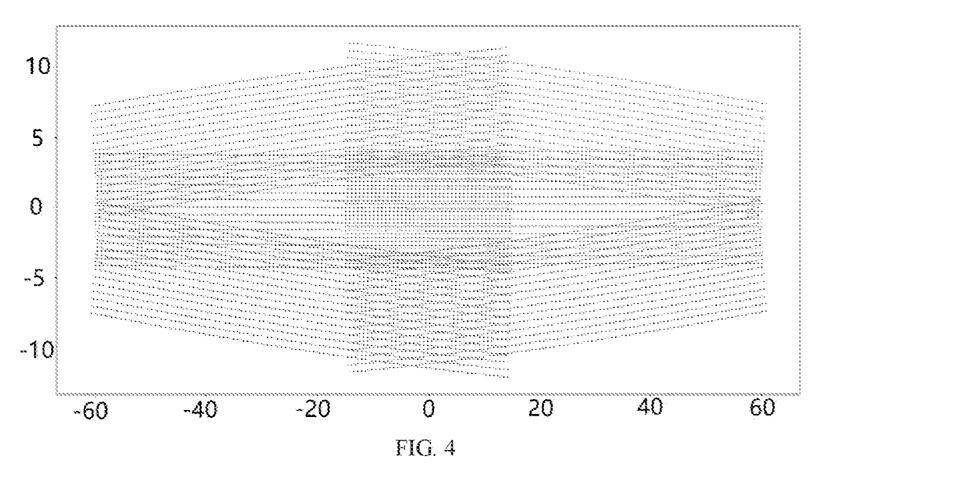
FIG. 4 is a point cloud simulation diagram of single frame scanning of the lidar system provided by the embodiments of the present disclosure.

As shown in FIGS. 2 and 3, the detectors 5 of different receiving units 4 arranged in the x direction are located in different positions in the x direction. That is, the detectors of different receiving units 4 arranged in the x direction (the vertical direction) are staggeringly arranged in the x direction (the vertical direction), so that the number of longitudinal lines of the lidar system can be doubled. As shown in FIG. 4, FIG. 4 is a point cloud simulation diagram of single frame scanning of the lidar system provided by the embodiment of the present disclosure. It can be seen from FIG. 4 that, an overlapped part in the middle of the field in the point cloud simulation diagram is a point cloud simulation diagram obtained after the target object is scanned by the detectors staggeringly arranged along a longitudinal direction. FIG. 4 may illustrate that the lidar system provided by the embodiment of the present disclosure can well realize the vertical interpolation and multiplication of the number of lines on the premise of meeting the indexes such as the size and the resolution of the field of view.

Optionally, in at least some of the receiving units, arrangement heights of different receiving units are different. By adjusting the heights of the receiving units, in at least some of the receiving units, the detectors of different receiving units arranged in the vertical direction are located in different positions in the vertical direction.

Figure 5:
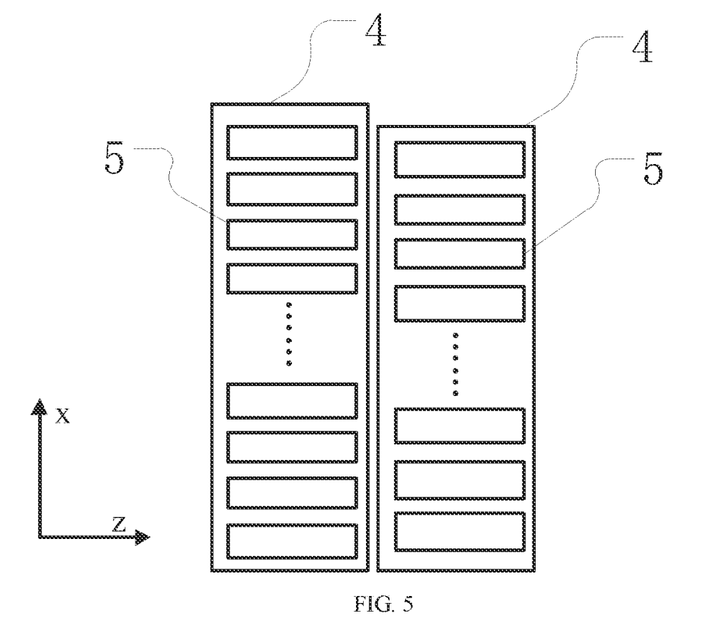
FIG. 5 shows an arrangement mode of detectors on different receiving units provided by the embodiments of the present disclosure.

Optionally, in at least some of the receiving units 4, the detectors of different receiving units 4 arranged in the x direction (the vertical direction) are staggeringly arranged in the x direction (the vertical direction). By adjusting the arrangement heights of different receiving units 4, the detectors 5 are staggeringly arranged, for example, as shown in FIG. 5, FIG. 5 shows an arrangement mode of detectors on different receiving units provided by the embodiment of the present disclosure. It can be seen from FIG. 5 that the detectors on two receiving units 4 are staggeringly arranged in the x direction, and the detectors 5 on the two receiving units 4 are overlapped to a certain extent in the x direction. Moreover, the heights of the two receiving units 4 in the x direction are different.

Figure 6:
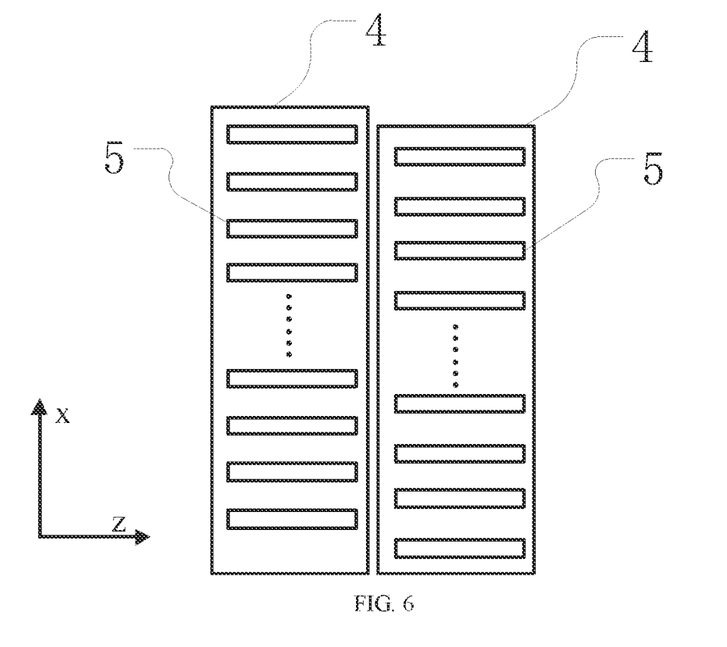
FIG. 6 shows another arrangement mode of the detectors on different receiving units provided by the embodiments of the present disclosure.

Optionally, in at least some of the receiving units 4, the detectors 5 of different receiving units 4 are staggeringly arranged in the vertical direction. By adjusting the arrangement heights of different receiving units 4, the detectors 5 are staggeringly arranged. For example, as shown in FIG. 6, FIG. 6 shows another arrangement mode of the detectors on different receiving units provided by the embodiment of the present disclosure. It can be seen from FIG. 6 that, the detectors 5 on different receiving units 4 are staggeringly arranged in the x direction, and the detectors 5 on two receiving units 4 are not overlapped in the x direction. Moreover, the heights of the two receiving units 4 in the x direction are different.

Illustratively, for example, one receiving unit 4 includes n detectors 5 and the other receiving unit 4 includes m detectors 5, and then an $n^{th}$ detector 5 is arranged between an $(m-1)^{th}$ detector 5 and an $m^{th}$ detector 5, wherein each of n and m is a positive integer greater than or equal to 1.

Figure 7:
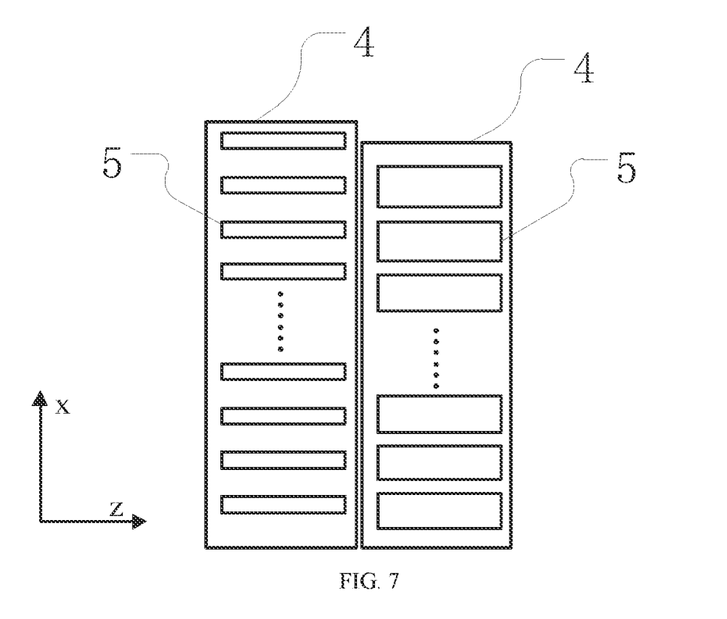
FIG. 7 shows another arrangement mode of the detectors on different receiving units provided the embodiments of the present disclosure.

Optionally, the receiving unit 4 in the lidar system is a linear array detector, and the linear array detector may be, for example, a linear array detector with 14 lines, 16 lines or 64 lines. Moreover, numbers of detectors 5 in different receiving units 4 may be the same or different, which means that the lidar system may include a variety of linear array detectors with different specifications, for example, a plurality of linear array detectors with the same specification may also be provided. Moreover, in at least some of the receiving units 4, the detectors 5 of the receiving units 4 with different specifications are staggeringly arranged in the vertical direction. For example, as shown in FIG. 7, FIG. 7 shows another arrangement mode of the detectors on different receiving units provided by the embodiment of the present disclosure. It can be seen from FIG. 7 that the detectors 5 of the receiving units 4 with different specifications are staggeringly arranged in the x direction, and the two receiving units 4 in FIG. 7 have different specifications. As illustrated in FIG. 7, in the x direction, the receiving unit 4 with the detectors 5 in lower positions has a larger number of lines, and the receiving unit 4 with the detectors 5 in higher positions has a smaller number of lines. Moreover, in FIG. 7, the detectors 5 on the two receiving units 4 with different specifications are partially overlapped in the x direction. Heights of the two receiving units 4 with different specifications in the x direction are different.

According to the lidar system provided by the embodiment of the present disclosure, the detectors on different receiving units may be staggeringly arranged in the vertical direction only by adjusting the arrangement heights of the receiving units, which is simple to operate and easy to realize, involving only fine adjustment without affecting the size of the whole system.

Optionally, pitch angles of at least some of the receiving units are different. That is, included angles between at least some of the receiving units and the horizontal direction are different. By adjusting the pitch angles of the receiving units, the detectors on different receiving units may also be staggeringly arranged in the vertical direction.

Optionally, the arrangement heights of at least some of the receiving units are the same, and the pitch angles of the receiving units with the same height are adjusted to be different values, which is equivalent to adjusting the heights of different receiving units in the vertical directions to be different values. Therefore, when the heights of the receiving units are the same and the pitch angles are different, the staggeringly arranged arrangement of the detectors on different receiving units as shown in FIG. 5, 6 or 7 may also be realized.

Optionally, when the arrangement heights of at least some of the receiving units are different and the pitch angles are also different, conventional height and pitch angle adjustment methods known to those skilled in the art are configured, which may also realize the staggeringly arranged arrangement of the detectors on different receiving units as shown in FIG. 5, 6, or 7.

Optionally, the optical rotating mirror includes a bottom surface and a plurality of reflecting surfaces surrounding the bottom surface. The included angles between different reflecting surfaces and the bottom surface are different.

Optionally, the optical rotating mirror may be, for example, a polygonal mirror, such as a three-sided mirror, a four-sided mirror, and a five-sided mirror, which is specifically selected according to the requirement of the optical design of the actual lidar system and is not limited in the present disclosure.

Figure 8:
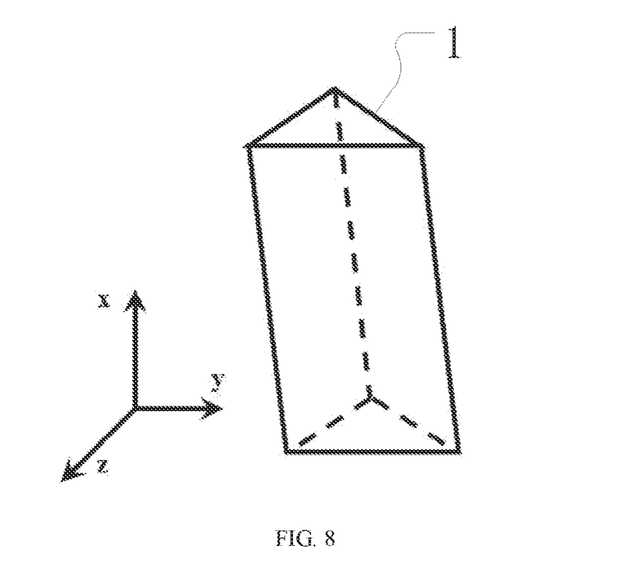
FIG. 8 is a schematic structural diagram of an optical rotating mirror provided by the embodiments of the present disclosure.

Not all of the reflecting surfaces of the optical rotating mirror are perpendicular to the bottom surface. Rather, there may be a certain dihedral angle between some of the reflecting surfaces. Taking the three-sided mirror as an example, as shown in FIG. 8, FIG. 8 is a schematic structural diagram of the optical rotating mirror provided by the embodiment of the present disclosure, wherein a vertical direction is an x direction, a horizontal direction is a y direction, and a light emitting direction of the lidar system is a z direction. As illustrated in FIG. 8, the optical rotating mirror 1 is the three-sided mirror. Three sides of the three-sided mirror are the reflecting surfaces. The entire optical rotating mirror 1 rotates around an x axis. A plane on which the bottom surface is located is a yz plane. When an included angle between each reflecting surface and the bottom surface is different, it is ensured that a measurement point cloud acquired by each laser transceiving module through each reflecting surface does not have a position change in the z direction of the light emitting direction. If each reflecting surface of the optical rotating mirror is perpendicular to the bottom surface, point clouds corresponding to different reflecting surfaces may shake back and forth in the z direction of the light-emitting direction during splicing, so that there is a measurement error when the lidar system acquires point cloud data. The different included angles between each reflecting surface of the optical mounting mirror and the bottom surface may well avoid this technical problem.

According to the structure of the lidar system shown in FIGS. 2 and 3, illustratively, taking the receiving unit being a detector with 16 lines as an example, the included angles between the three reflecting surfaces of the optical rotating mirror and the yz plane of the bottom surface are 85°, 90°, and 95°, respectively. A pitch angle of one receiving unit 4 is 0°, that is, the receiving unit 4 is perpendicular to the y-z plane. A pitch angle of the other receiving unit 4 is a depression angle of 0.5°, that is, the receiving unit 4 forms a depression angle of 0.5° with the y-z plane. The lidar system may realize a high point cloud density of 96 lines of a central overlapped field in a vertical direction within a range of a horizontal field angle of 120°, thus achieving an angular resolution of 0.2° in a vertical field angle of 19.6°.

In the lidar system provided by the embodiment of the present disclosure, the height of the whole system may be limited to less than 50 mm, and meanwhile, the number of longitudinal lines can be amplified by 6 times, which means that an angular resolution of 96 lines can be achieved by using the detector of 16 lines, and an angular resolution of 144 lines can be achieved by using the detector of 24 lines. Moreover, cooperated with corresponding optical system of the receiving unit, the vertical field angle of 19.2°/28.8° is ensured on the premise of meeting a resolution of a field angle of 0.2°.

Figure 9:
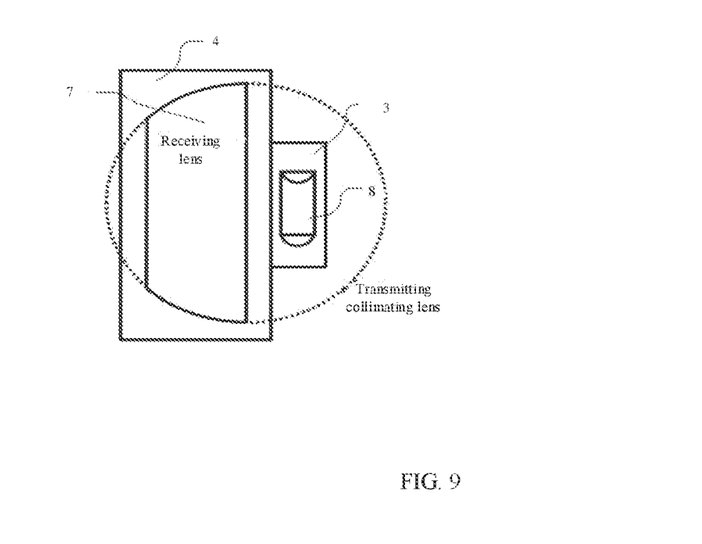
FIG. 9 is a schematic structural diagram of a laser transceiving module provided by the embodiments of the present disclosure.

As shown in FIG. 9, optionally, FIG. 9 is a schematic structural diagram of the laser transceiving module provided by the embodiment of the present disclosure. It can be seen from FIG. 9 that the receiving unit 4 is further integrated with a receiving lens 7, and the receiving lens 7 is not overlapped with the transmitting unit 3. Because the receiving lens 7 cannot cover the transmitting unit 3, a distance between the transmitting unit 3 and the receiving unit 4 is increased, thus increasing a size of the laser transceiving module. However, after the receiving lens 7 is integrated into the receiving unit 4, and a size of the receiving lens 7 is smaller than that of the receiving unit 4, which means the receiving lens 7 is not overlapped with the transmitting unit 3, the distance between the transmitting unit 3 and the receiving unit 4 can be reduced, thus reducing the size of the whole laser transceiving module.

Optionally, in order to reduce the size of the entire laser transceiving module and ensure a receiving field of view of the lidar system at the same time, the receiving unit is also integrated with a receiving lens with a special-shaped cut, and a projection of the receiving lens on the receiving unit is located in the receiving unit. That is, the receiving lens is with a special-shaped cut.

Optionally, after the receiving lens 7 is cut in a special shape, the size of a circumscribed circle of the receiving lens is defined. As shown in FIG. 9, the receiving lens 7 is circumscribed by a dotted circle. As such, the receiving field of the lidar system may be maintained, and only a part of the lens is cut, resulting in the reduction of the distance between the transmitting unit 3 and the receiving unit 4 and the overall size of the laser transceiving module. Meanwhile, the projection of the receiving lens on the receiving unit is located inside the receiving unit, that is, the size of the receiving lens is smaller than that of the receiving unit, which further reduces the distance between the receiving unit and the transmitting unit. The situation that the distance between the transmitting unit and the receiving unit needs to be increased to ensure that the transmitting unit is not overlapped with the receiving lens due to an excessively large receiving lens is avoided, thus increasing the size of the whole lidar system.

A shape and a size of the receiving lens 7 are designed according to the requirement of the optical design of the actual lidar system, which are not limited in the present disclosure.

As shown in FIG. 9, optionally, the transmitting unit 3 is integrated with a transmitting collimating lens 8, the transmitting collimating lens 8 is integrated in the transmitting unit 3, and the transmitting collimating lens 8 is not overlapped with the receiving unit 4, so that the distance between the transmitting unit 3 and the receiving unit 4 and the overall size of the laser transceiver module can be further reduced.

Optionally, the transmitting unit may be integrated on one side of the receiving unit, for example, the transmitting unit may be integrated on one side of the receiving unit in the light emitting direction of the system, or the transmitting unit may be integrated at a top portion of the receiving unit in the vertical direction. However, when the transmitting unit is integrated on one side of the receiving unit in the light emitting direction of the system, the height of the whole laser transceiving module can be reduced.

Optionally, in different laser transceiving modules, a position of the transmitting unit integrated in the receiving unit may be the same or different.

Optionally, each laser transceiving module further includes a reflector set; and the reflector set is configured to reflect the laser signal transmitted by the transmitting unit to the optical rotating mirror, the laser signal is reflected by the optical rotating mirror to the target object, and the echo signal obtained after the laser signal is diffusely reflected on the target object is reflected by the optical rotating mirror to the receiving unit for receiving. An optical axis of the receiving unit coincides with a direction of the laser signal reflected by the reflector set to the optical rotating mirror. An optical axis of the receiving unit is an optical axis of the receiving lens.

The echo signal obtained after diffuse reflection does not need to be reflected again by a reflector. The echo signal obtained after diffuse reflection is reflected by the optical rotating mirror, and is directly received by the receiving lens and transmitted to the receiving unit within a large aperture range not blocked by the reflector set. Even if a part of the receiving lens blocked by the reflector set cannot receive the echo signal, a structural design of the reflector set can not only affect an existing distance measurement effect of the lidar system, but also effectively avoid the technical problem of distance measurement blind area or measurement range reduction caused by the situation that the echo signal cannot be received at a certain distance due to staggeringly arranged transmitting and receiving fields, which is equivalent to increasing a measurement range of the lidar system to a certain extent.

Figure 10:
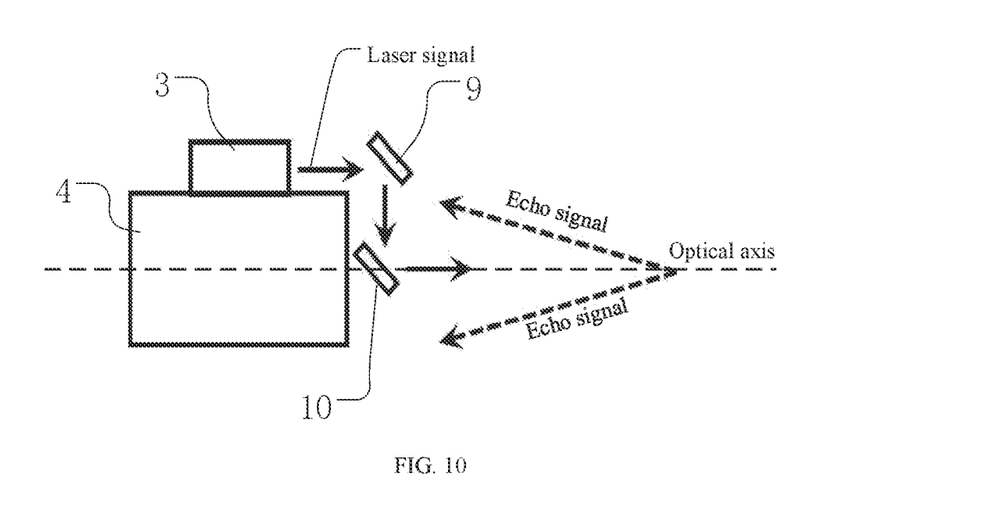
FIG. 10 is another schematic structural diagram of the laser transceiving module provided by the embodiments of the present disclosure.

As shown in FIG. 10, optionally, FIG. 10 is another schematic structural diagram of the laser transceiving module provided by the embodiment of the present disclosure. As shown in FIG. 10, the reflector set includes a first reflector 9 and a second reflector 10. The first reflector 9 is configured to reflect the laser signal transmitted by the transmitting unit 3 to the second reflector 10. The second reflector 10 is configured to reflect the laser signal reflected by the first reflector 9 to the optical rotating mirror, and the laser signal is reflected by the optical rotating mirror to the target object. The echo signal produced by the diffuse reflection of the laser signal on the target object is reflected by the optical rotating mirror to the receiving unit 4. The optical axis of the receiving unit 4 coincides with a direction of the laser signal reflected by the second reflector 10 to the optical rotating mirror.

In the actual lidar system, the transmitting unit transmits the laser signal to the target object, and the echo signal produced by the diffuse reflection of the laser signal on the target object is reflected by the optical rotating mirror and then received by the receiving unit. However, in some cases, the target object may be too far from the lidar system, so that the receiving unit may not receive the echo signal. This may create distance measurement blind areas or cause measurement range reduction. In the lidar system provided by the embodiments of the present disclosure, each laser transceiving module further includes the reflector set, and the optical axis of the receiving unit coincides with the direction of the laser signal reflected by the reflector set to the optical rotating mirror. This may ensure that the energy of the laser signal transmitted along the optical axis of the receiving unit is the strongest. Therefore, even if light is diffusely reflected on the target object in multiple directions, the energy of the echo signal along the optical axis of the receiving unit is bound to be the strongest. Therefore, even if a distance from the target object is very far, it is also ensured that the receiving unit can receive a part of echo signal, thus effectively avoiding the technical problem of distance measurement blind area or measurement range reduction caused by the situation that the echo signal cannot be received at a certain distance due to staggeringly arranged transmitting and receiving fields.

As shown in FIG. 10, optionally, the first reflector 9 and the second reflector 10 are arranged in parallel, and an included angle between the first reflector 9 and an optical axis of the transmitting unit 3 ranges from 40 degrees to 50 degrees. Preferably, the included angles between the first reflector 9 and the second reflector 10 and the optical axis of the transmitting unit 3 are 45 degrees. When the included angles are 45 degrees, it is convenient to reduce the size of the whole laser transceiving module. An extending direction of the optical axis of the transmitting unit is controlled by a laser chip in the transmitting unit, that is, the optical axis of the transmitting unit is an optical axis of light transmitted by the laser chip in the transmitting unit. Optionally, the optical axis of the transmitting unit is parallel to the optical axis of the receiving unit.

Optionally, the reflector set may include, for example, two, three, four, five, or more reflectors, and the optical axis of the receiving unit coincides with the direction of the laser signal reflected by the reflector set to the optical rotating mirror. The number and the positions of the reflectors in the reflector set may be set according to the requirements of the optical design of the actual lidar system, which are not limited in the present disclosure.

Optionally, for the number of transverse lines of the lidar system, the number of transverse lines can be increased by setting a required measurement frequency and matching calculation power of a corresponding signal processing system. For example, conventional technical means known to those skilled in the art may be used to increase the number of transverse lines, which is not limited in the present disclosure.

In the lidar system provided by the embodiment of the present disclosure, multiple laser transceiving modules are provided, which can double the numbers of longitudinal lines of the detectors of different receiving units. The optical rotating mirror of the lidar system includes multiple reflecting surfaces, and the receiving lens is not overlapped with the transmitting unit. According to the lidar system designed on the basis of the above technical features, a low-cost optical rotating mirror scanning module may be configured, which effectively solves the technical problem about how to control the system height of the lidar system with the high number of lines to be less than 50 mm and maintain the resolution of the field angle of 0.2° under sufficient coverage of the field angle (about 200 or above) at the same time.

It should be noted that relational terms, such as "first" and "second", and the like, configured herein are only intended to distinguish one entity or operation from another entity or operation, and do not necessarily require or imply that any such actual relationship or sequence exists between these entities or operations. Furthermore, the terms "comprise", "include", or any other variation thereof, are intended to cover a non-exclusive inclusion, so that a process, a method, an article, or equipment that includes a list of elements not only includes those elements but also includes other elements not expressly listed, or further includes elements inherent to such process, method, article, or equipment. In a case without further limitations, an element defined by the phrase "comprising one . . . " does not preclude the presence of additional identical elements in the process, method, article, or equipment that includes the element.

The foregoing descriptions are only specific embodiments of the present disclosure, such that those skilled in the art can understand or realize the present disclosure. Many modifications to these embodiments will be obvious to those skilled in the art, and general principles defined herein may be realized in other embodiments without departing from the spirit or scope of the present disclosure. Therefore, the present disclosure will not be limited to these embodiments shown herein, but should comply with the widest scope consistent with the principles and novel features disclosed herein.

INDUSTRIAL APPLICABILITY

According to the lidar system provided by the present disclosure, the number of longitudinal lines of the detector on the receiving unit in the vertical direction can be doubled under the condition that the horizontal field angle is not changed, and the lidar system is simple in structure and easy to implement. The technical problem about how to ensure the high number of lines without increasing the size of the entire lidar system is solved. Meanwhile, the lidar system can not only take into account a size and a cost, but also achieve the goal of low-cost mass production on the premise of meeting the indexes such as the size and the resolution of the field angle. The lidar system has very strong industrial applicability.

What is claimed is:

1. A lidar system, comprising:
an optical rotating mirror; and
at least two laser transceiving modules, wherein a first laser transceiving module of the at least two laser transceiving modules comprises: a first transmitting unit including a first laser device configured to transmit a first laser signal and a first receiving unit comprising a first plurality of detectors arranged in a first array in a vertical direction, wherein a second laser transceiving module of the at least two laser transceiving modules comprises: a second transmitting unit including a second laser device configured to transmit a second laser signal and a second receiving unit comprising a second plurality of detectors arranged in a second array in the vertical direction;

wherein the optical rotating mirror is configured to: rotate around a rotating axis in the vertical direction, receive the first laser signal and the second laser signal, adjust directions of the first laser signal and the second laser signal during the rotation, and reflect the first laser signal and the second laser signal to a target object, wherein echo signals produced by a diffuse reflection of the first laser signal and the second laser signal on the target object are reflected by the optical rotating mirror and are then received by the first receiving unit and the second receiving unit;

wherein the first receiving unit and the second receiving unit are arranged at different heights in the vertical direction so that the first plurality of detectors and the second plurality of detectors are located in different positions in the vertical direction and correspond to different longitudinal lines of the lidar system, and wherein each of the first plurality of detectors partially overlaps with one of the second plurality of detectors in the vertical direction.

2. The lidar system according to claim 1, wherein scanning angle ranges covered by adjacent laser transceiving modules of the at least two laser transceiving modules are contiguously overlapped or partially overlapped.

3. The lidar system according to claim 1, wherein the first plurality of detectors and the second plurality of detectors are staggeringly arranged in the vertical direction.

4. The lidar system according to claim 1, wherein pitch angles of the first receiving unit and the second receiving unit are different.

5. The lidar system according to claim 1, wherein the optical rotating mirror comprises a bottom surface and a plurality of reflecting surfaces surrounding the bottom surface, and wherein included angles between different reflecting surfaces and the bottom surface are different.

6. The lidar system according to claim 1, wherein the first receiving unit is integrated with a receiving lens with a special-shaped cut, and wherein a projection of the receiving lens on the first receiving unit is located in the first receiving unit.

7. The lidar system according to claim 1, wherein the first laser transceiving module further comprises a reflector set, wherein the reflector set is configured to reflect the first laser signal transmitted by the first transmitting unit to the optical rotating mirror, wherein the first laser signal is reflected by the optical rotating mirror to the target object, wherein the echo signal produced by the diffuse reflection of the first laser signal on the target object is reflected by the optical rotating mirror to the first receiving unit for reception, and wherein an optical axis of the first receiving unit coincides with a direction of the first laser signal reflected by the reflector set to the optical rotating mirror.

8. The lidar system according to claim 7, wherein the reflector set comprises a first reflector and a second reflector, wherein the first reflector is configured to reflect the first laser signal transmitted by the first transmitting unit to the second reflector, wherein the second reflector is configured to reflect the first laser signal reflected by the first reflector to the optical rotating mirror, wherein the first laser signal is reflected by the optical rotating mirror to the target object, wherein the echo signal produced by the diffuse reflection of the first laser signal on the target object is reflected by the optical rotating mirror to the first receiving unit, and wherein the optical axis of the first receiving unit coincides with a direction of the first laser signal reflected by the second reflector to the optical rotating mirror.

9. The lidar system according to claim 8, wherein the first reflector is parallel to the second reflector, and wherein an included angle between the first reflector and an optical axis of the first transmitting unit ranges from 40 degrees to 50 degrees.

* * * * *